P. S. WOOD.
SHORTENING MIXER.
APPLICATION FILED MAR. 16, 1912.
1,038,469.
Patented Sept. 10, 1912.
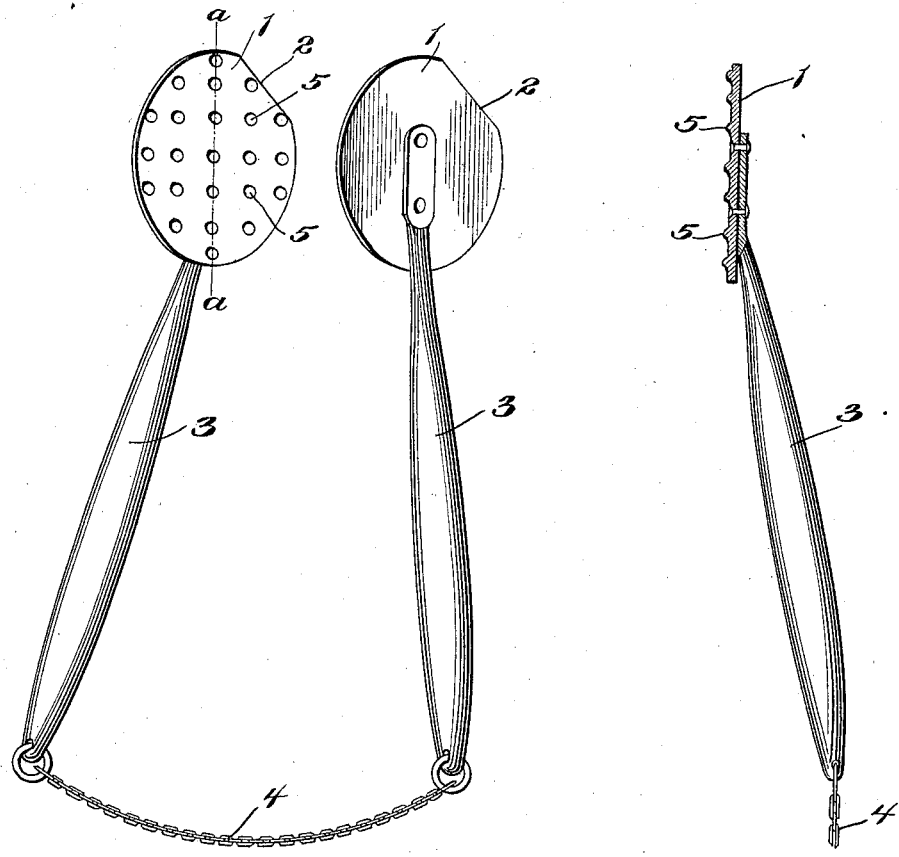
Witnesses
W. H. Mulligan
J. W. Garner
Inventor
Peter S. Wood.
By Victor J. Evans,
Attorney

UNITED STATES PATENT OFFICE.

PETER S. WOOD, OF BURTON, WASHINGTON.

SHORTENING-MIXER.

1,038,469.

Specification of Letters Patent. Patented Sept. 10, 1912.

Application filed March 16, 1912. Serial No. 684,244.

*To all whom it may concern:*

Be it known that I, PETER S. WOOD, a subject of the King of England, residing at Burton, in the county of King and State of Washington, have invented new and useful Improvements in Shortening-Mixers, of which the following is a specification.

This invention is an improved shortening mixer, especially adapted for use in mixing shortening, such as lard, butter, cottolene or the like, with dry flour when mixing dough for pastry, or other like articles, the object of the invention being to provide an improved device of this character by means of which the shortening may be mixed with flour without the necessity of placing the hands in the mixture, the invention consisting in the construction and arrangement of devices hereinafter described and claimed.

In the drawings:—Figure 1 is a perspective view of a shortening mixer constructed in accordance with my invention. Fig. 2 is a detail transverse sectional view on the plane indicated by the line *a—a* of Fig. 1.

In the embodiment of my invention, I provide a pair of mixing disks 1 of suitable size and shape, which are preferably made of sheet metal. Each of these disks is flattened on one side to provide a straight edge 2 which may be employed for scraping a vessel of rectangular form. These disks are each provided on the outer side, with a handle 3, the handles being connected together by a chain or other suitable flexible connecting element 4 of suitable length. The disks are provided on their opposing inner sides with projections 5, which are uniform in size.

In the use of my invention, the handles are grasped by the operator and the devices are manipulated by him so as to cause the mixture of flour and shortening to be rubbed between the disks, the projections of each disk entering the spaces between the projections of the other disk so as to cause the flour and shortening to be thoroughly mixed, as will be understood.

By the use of my improved mixing device, the necessity of placing the hands in the mixture of flour and shortening is entirely avoided and injury to the mixture by the heat from the hands is also entirely avoided. The round edges of the disks may be employed for scraping the vessel, if the latter is of bowl-like form but when the vessel is of rectangular form the straight edges 2 of the disks will be employed for this purpose.

While I have herein shown and described a preferred form of my invention, I would have it understood that changes may be made in the form, proportions and construction of the several parts without departing from the spirit of my invention and within the scope of the appended claims.

I claim:—

1. The herein described shortening mixer comprising a pair of handled disks provided with projections on their opposing sides.

2. The herein described shortening mixer comprising a pair of handled disks having projections on their opposing sides, each disk being also provided at one side with a straight edge.

In testimony whereof I affix my signature in presence of two witnesses.

PETER S. WOOD.

Witnesses:
C. W. YOUNG,
CHAS. H. LEVER.